United States Patent [19]
Lejdegård

[11] 3,969,974
[45] July 20, 1976

[54] CONFIGURATION FOR NUTS AND BOLT HEADS

[75] Inventor: Sixten H. Lejdegård, Ramnas, Sweden

[73] Assignee: Bulten-Kanthal Aktiebolag, Sweden

[22] Filed: Feb. 26, 1974

[21] Appl. No.: 445,920

[30] Foreign Application Priority Data
Feb. 27, 1973 Sweden.......................... 73027195

[52] U.S. Cl........................................ 85/45; 10/24; 10/27 R; 85/9 R
[51] Int. Cl.²..................... F16B 23/00; F16B 35/00
[58] Field of Search...................... 85/45, 9 R, 32 R; 10/27 R; 145/50 R; 81/90 B

[56] References Cited
UNITED STATES PATENTS

| | | | |
|---|---|---|---|
| 2,969,250 | 1/1961 | Kull..................................... | 85/45 X |
| 3,352,190 | 11/1967 | Carlson............................... | 85/45 X |
| 3,354,757 | 11/1967 | Grimm et al........................ | 85/45 X |

*Primary Examiner*—Ramon S. Britts
*Attorney, Agent, or Firm*—Hill, Gross, Simpson, Van Santen, Steadman, Chiara & Simpson

[57] ABSTRACT

The wrenching portion of a nut or a bolt head is provided with a configuration which, when viewed in plan, comprises an outer cylinder having a plurality of grooves defined in part by re-entrant concave surfaces and equiangularly spaced about its periphery, the regions of intersection of the grooves with the outer cylinder being planar. The grooves may be altogether part-cylindrical in cross section, or may they have a part-cylindrical bottom surface which merges with two planar inclined side surfaces.

Also disclosed is a matrix or die for use in manufacture of nuts or bolts having a splined wrenching portion, said matrix or die having a die cavity adapted to form the regions of intersection of the grooves with the outer cylinder as planar surfaces.

6 Claims, 9 Drawing Figures

CONFIGURATION FOR NUTS AND BOLT HEADS

BACKGROUND OF THE INVENTION

This invention relates to rotatable fasteners (such as screws, bolts or nuts) having a drive formation which is capable of being engaged by a suitable tool to drive the fastener rotatably.

PRIOR ART

It has been known to provide drive formations of a hexagonal external shape as seen in plan, such drive formations being engageable by a hexagonal socket wrench.

In order to improve the torque characteristics when driving fasteners, proposals have been made to use "double hexagon" external drive formations having 12 points separated from each other by V-shaped grooves. External drive formations of this type can be driven only by a 12 pointed double hexagon socket type wrench.

Another proposal has been to make such formations of 12 splined form, an external drive formation of this kind having an outer cylindrical shape into which are sunk 12 equiangularly spaced part-cylindrical grooves, the region of intersection between the side of any part-cylindrical groove and the adjacent part of the outer cylindrical shape being curved and the radius of the part-cylindrical groove being many times larger than that of said curved region of intersection.

Fasteners having drive formations as set out in the preceding paragraph are hereinafter called "conventional spline drive" fasteners. Conventional spline drive fasteners can be driven using only a special correspondingly splined tool.

It has been found, however, that conventional spline drive fasteners have certain disadvantages.

At the curved regions of intersection there is a tendency, when applying excessive drive torques and when using worn or otherwise deformed spline drive tools, for metal from the curved region of intersection to flow under the torque forces exerted thereon by the driving tool to form burrs facing in the direction of driven rotation. If excessive burr formation occurs, it can be difficult or impossible to engage a special spline tool with the thus deformed drive formation.

OBJECTS OF THE INVENTION

One important object of the present invention is to provide an improved form of drive formation which tends to overcome or reduce the above mentioned disadvantages of prior art conventional spline drive fasteners.

Another important object of the present invention is to provide an improved drive formation which permits higher drive torques to be applied to the fastener than those permissible with conventional spline drive fasteners without causing objectionable burrs to be formed.

SUMMARY OF THE INVENTION

According to the invention there is provided an external drive formation, having a surface which, when viewed in plan, comprises an outer cylinder having a plurality of grooves defined in part by re-entrant concave part-cylindrical surfaces of smaller radius of curvature than said outer cylinder and equiangularly spaced about its periphery, in which the regions of intersection of said re-entrant part-cylindrical surfaces with said outer cylinder are planar.

Preferably, said plurality of re-entrant concave part-cylindrical surfaces comprises twelve such surfaces.

Each region of intersection may be disposed at an acute angle with respect to the adjacent part-cylindrical surface.

According to another aspect of the invention there is provided an external drive formation, having a surface which, when viewed in plan, comprises an outer cylinder having a plurality of grooves equiangularly spaced about the periphery of the cylinder, each groove defined in part by a part cylindrical bottom surface of much smaller radius of curvature than said outer cylinder and, merging with said bottom surface, two planar side surfaces, inclined with respect to radial planes of the outer cylinder and intersecting said outer cylinder, wherein the regions of intersection of said planar groove side surfaces with said outer cylinder are planar and inclined with respect to radial planes of the outer cylinder under angles different from the angles of inclination of said planar groove side surfaces.

ON THE DRAWINGS

AS SHOWN IN THE DRAWINGS

Figure 1:
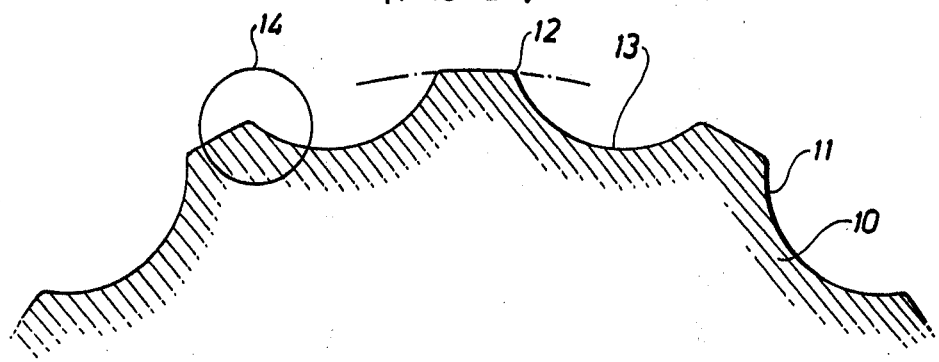
FIG. 1 represents part of an external spline drive formation of prior art.

FIG. 1 of the drawings shows, in general outline, the shape of the drive formation of the prior art spline drive type. The fastener is indicated by the numeral 10 and the driving surface 11 is an external drive formation comprising an outer cylinder 12 which is broken at 12 equiangularly spaced positions by concave part-cylindrical grooves 13 which are re-entrant within the outer cylinder 12. Each groove 13 has a radius which is several times smaller than the radius of curvature of the outer cylinder 12.

Between each groove 13 and the adjacent part of the outer cylinder 12, there is a region of intersection such as that encircled at 14. In conventional spline drive fasteners this region of intersection is curved, the radius of curvature being several times smaller than that of the groove 13 as will be appreciated from the fact that the curved region cannot clearly be distinguished in FIG. 1 for reasons of scale.

Figure 2:
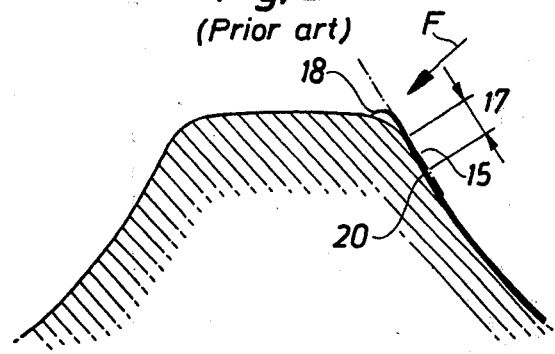
FIG. 2 is a detailed view on an enlarged scale of the point of contact of one of the driving surfaces of the wrench with said prior art spline drive formation.

FIG. 2 illustrates the region 14 of the prior art shown in FIG. 1. The arrow F indicates the direction of rotation of the fastener driving tool and a tool-surface 15 contacts the fastener 10 at an area 17 of contact and exerts a force on the fastener at the area 17. This force tends to cause the metal at the area of contact to flow forwardly so that it forms a burr 18, and thus preventing subsequent use of an unworn or undamaged special splined socket type tool.

Figure 3:
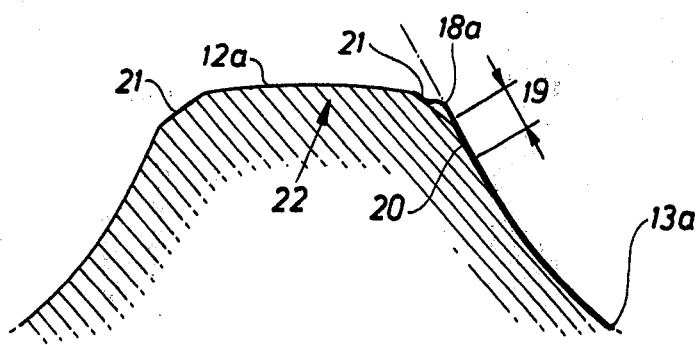
FIG. 3 is a similar view showing the engagement of the wrench with the threaded spline drive fastener according to one aspect of the invention.

FIG. 3 shows a fastener 22 having a drive formation according to one aspect of the present invention. This formation is the external wrenching formation on a bolt or nut. This formation has a limited or concentrated area of contact 19 between the fastener driving tool-surface 15 and the fastener 22. The region of intersection between the part-cylindrical groove 13a and the outer cylinder 12a is formed as a flat 21 which is disposed at an acute angle to the associated drive face 20 of the groove 13a such as at an angle of the order of about 20°.

Where metal flow occurs, it takes the form shown in FIG. 3. Most of the force tends to be concentrated on the forward end of the drive face 20. Any metal which is forced forwardly from this position tends to build up on the flat 21 as indicated at 18a so that the overall result is that the displaced metal does not form a burr on the outer cylinder surface but tends to build up on the flat as shown.

Therefore the fastener can at all times be engaged by a special spline drive tool and there is no danger of this being prevented by burr formation as is the case with the conventional spline drive fastener.

The flats 21 have some advantages as regards the manufacture of the fasteners. The cold heading matrices for forming the heads of the conventional spline drive fasteners can only be made by so-called electro-erosion or cold pressing. In both cases a master is required the shape of which closely corresponds to the ultimate shape of the head of the fastener. Using present-day methods small radius of the above discussed region of intersection can only be produced with great difficulty, e.g. by means of a whetstone. There, the accuracy and uniformity is not always satisfactory. Now, on the other hand, as the said regions are formed as flats, these can be produced fairly easily and in a controlled manner in a suitable machine, so that the accuracy and uniformity need not be questioned.

Figure 3A:
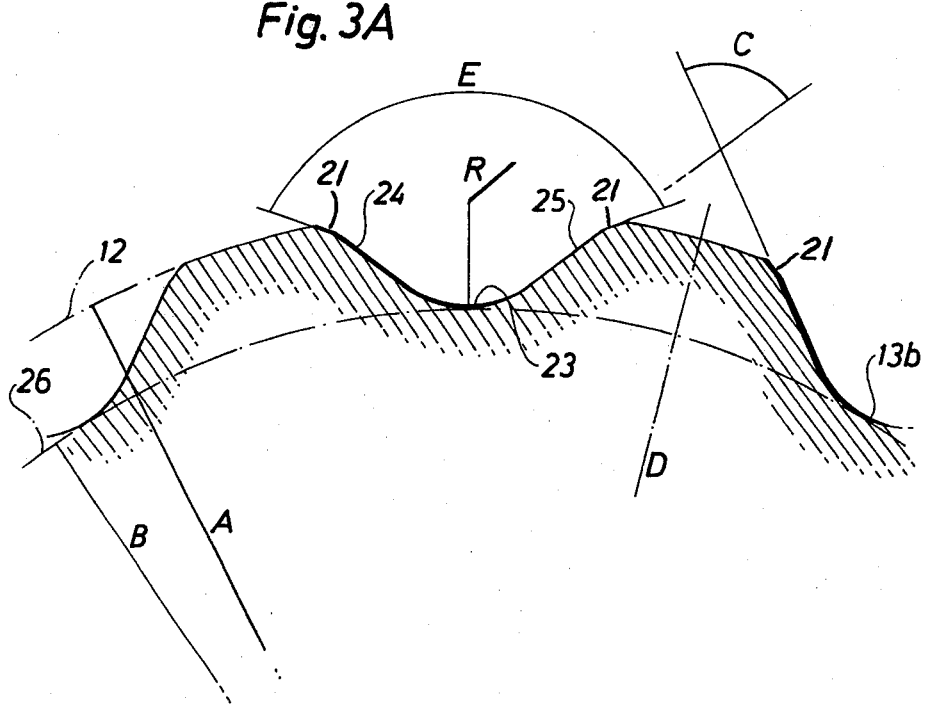
FIG. 3A is a view showing the engagement of the wrench with the threaded spline drive fastener according to a second aspect of the invention.

Generally, the same considerations as those above apply also to the drive formation as shown in FIG. 3A. In FIG. 3A, however, the grooves 13b are not defined by part-cylindrical surfaces as described above. Instead, the grooves 13b are defined in part by a part-cylindrical bottom surface 23 and, merging therewith, two planar side surfaces 24,25 which are inclined with respect to radial planes of the outer cylinder and which merge with the flats or planar regions 21 that intersect such cylinder.

Figure 4:
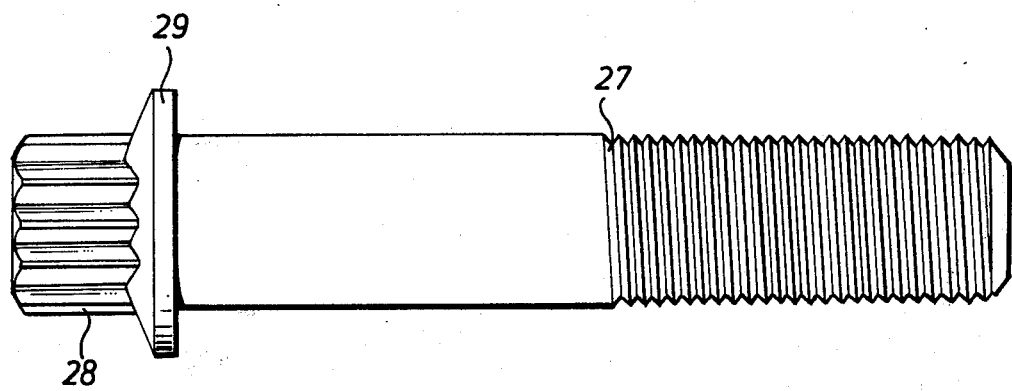
FIG. 4 is a side view of a threaded spline drive fastener according to the invention, designed as a flange screw.
Figure 5:
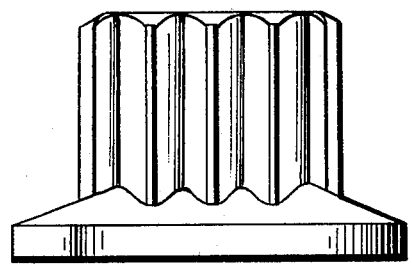
FIG. 5 is a side view of a threaded spline drive fastener according to the invention, designed as a flange nut.
Figure 6:
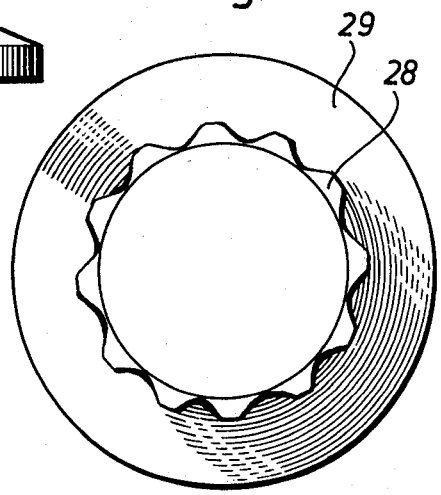
FIG. 6 is a top plan view of the flange screw in FIG. 4.
Figure 7:
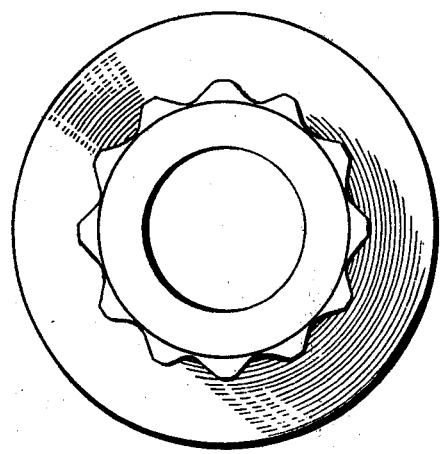
FIG. 7 is a top plan view of the flange nut in FIG. 6.

In a typical example, with a flange screw of the type as shown in FIGS. 4 and 6, comprising a threaded stem portion 27 and a head 28 with a flange 29 and having an external thread diameter of 20.0 millimeters, as a maximum, the outer cylinder 12 may have an outer diameter A of 23.25 to 23.40 millimeters, whereas an inner cylinder 26 on which the groove bottoms are disposed, may have a diameter B of 20.68 to 20.83 millimeters. The side surfaces 24,25 may form an angle C of 80° ± 1° with each other, and thus form an angle on the order of 40° with a radial plane D of the outer cylinder 12. From the above it may be understood that the two planar sides 24,25 of one and the same groove 13b may form an angle on the order of 110° with each other. In that case, the radius of curvature of the part-cylindrical bottom surface of the groove 13b will be on the order of 1.75 to 1.90 millimeters. Preferably, the planar surfaces 21 at each edge of a groove should form an angle E on the order of 150° with each other, and the width a such planar surfaces, measured "circumferentially" of the drive formation could be of the order of 0.55 to 0.65 millimeters with the fastener now chosen as an example.

Figure 8:
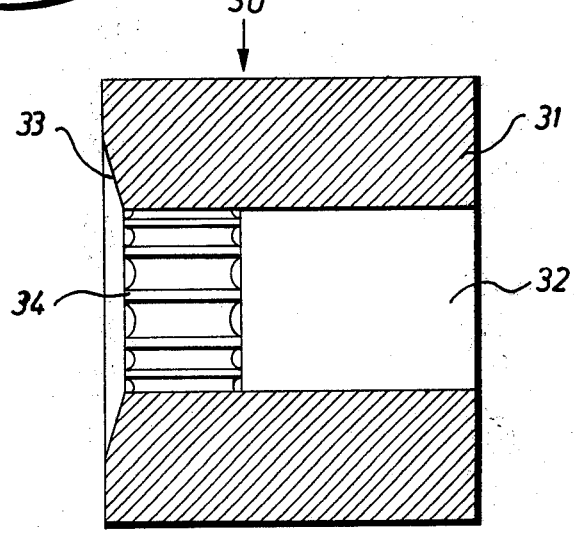
FIG. 8 is an elevation in axial section of a suitable die or matrix for use in manufacture of threaded spline drive fasteners according to the invention.

The die or matrix, generally denoted 30 in FIG. 8, comprises an essentially cylindrical body 31 of a suitable material, having a throughgoing bore 32. One end portion of said bore 32 and the adjacent end surface 33 of the body 31 are formed, such as by electroerosion, to have a cavity 34 adapted to impart to a nut or screw head the particular configuration according to the invention as set forth above, as a blank is forced into said cavity 34, such as in the course of a cold heading operation.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A threaded metal fastener having an external rotational drive formation having a surface which, when viewed in plan, comprises an outer cylinder having a plurality of at least partially concave re-entrant surfaces of smaller radius of curvature than said outer cylinder and equiangularly spaced about its periphery, each of the regions of intersection of said re-entrant surfaces with said outer cylinder being planar and disposed at an angle on the order of 20° with respect to an immediately adjacent drive face portion of the re-entrant surface to provide a clearance for reception of any built-up metal.

2. A fastener according to claim 1 in which said concave re-entrant surfaces comprise a part-cylindrical surface portion centrally located between and merging with two additional planar side surface portions which merge with said planar regions.

3. A fastener according to claim 2 in which said adjacent planar side surface portions of adjacent re-entrant surfaces form an angle on the order of 80° with each other.

4. A fastener according to claim 3 in which the radius of curvature of said centrally located part-cylindrical surface portion is no more than one-tenth of the radius of said outer cylinder.

5. A fastener according to claim 1 in which the width of said planar regions of intersection circumferentially of the outer cylinder is between one-hundredth and three-hundredths of the radius of curvature of said outer cylinder.

6. A threaded metal fastener having an external rotational drive formation having a surface which in plan comprises an outer cylinder having a plurality of concave re-entrant surfaces, which surfaces include:

a. a part cylindrical surface portion having a radius of curvature no more than one-tenth of the radius of the outer cylinder, each of the part cylindrical surface portions being equiangularly spaced about the cylinder;

b. two planar side surface portions with which said part cylindrical surface merges and between which said part cylindrical surface is centrally located, said side surface portions forming an angle of about 80° with a side surface portion of an adjacent reentrant surface; and.

c. planar regions connecting said planar side surface portions to the outer cylinder, and disposed at an angle of about 20° with respect to the immediately adjacent planar side surface portion.

* * * * *